United States Patent [19]

Liebler et al.

[11] Patent Number: 4,680,359

[45] Date of Patent: Jul. 14, 1987

[54] MOLDING COMPOSITIONS FOR OPTICALLY READABLE INFORMATION-STORAGE MEDIA

[75] Inventors: Ralf Liebler, Darmstadt; Klaus Albrecht, Mainz, both of Fed. Rep. of Germany

[73] Assignee: Röhm GmbH, Darmstadt, Fed. Rep. of Germany

[21] Appl. No.: 661,366

[22] Filed: Oct. 16, 1984

[30] Foreign Application Priority Data

Oct. 19, 1983 [DE] Fed. Rep. of Germany ....... 3337890

[51] Int. Cl.$^4$ .............................................. C08F 20/10
[52] U.S. Cl. ................................... 526/309; 526/269; 526/270
[58] Field of Search ........................................ 526/309

[56] References Cited

U.S. PATENT DOCUMENTS

| | | | |
|---|---|---|---|
| 2,404,268 | 7/1946 | Barnes | 526/309 |
| 2,886,549 | 5/1959 | Bartl | 526/309 |
| 4,188,433 | 2/1980 | Dijkstra et al. | 428/64 |
| 4,310,919 | 1/1982 | Slaten | 369/275 |
| 4,509,163 | 4/1985 | Kamada et al. | 526/309 |

FOREIGN PATENT DOCUMENTS

| | | |
|---|---|---|
| 97948 | 1/1984 | European Pat. Off. . |
| 3028498 | 3/1982 | Fed. Rep. of Germany . |
| 3248601 | 7/1984 | Fed. Rep. of Germany . |
| 3248602 | 7/1984 | Fed. Rep. of Germany . |
| 1351223 | 4/1974 | United Kingdom . |
| 1563670 | 3/1980 | United Kingdom . |
| 1576207 | 10/1980 | United Kingdom . |
| 2130227 | 5/1984 | United Kingdom . |

OTHER PUBLICATIONS

Kunststoff-Handbuch, vol. IX, pp. 351–352, Carl Hanser Verlag, Munich 1975.

*Primary Examiner*—Paul R. Michl
*Attorney, Agent, or Firm*—Curtis, Morris & Safford

[57] ABSTRACT

Copolymers, adaptable for use as molding compositions for optically readable data storage media, said copolymers being free of aromatic groups and comprising;

(A) 5 to 95 percent by weight of at least one ester of the formula

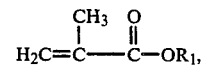

wherein $R_1$ is an unsubstituted or alkyl substituted alicycle having from 5 to 19 carbon atoms, a homopolymer of such an ester having a Vicat softening temperature above 80° C.;

(B) 90 to 5 percent by weight of at least one ester of the formula

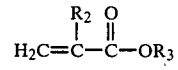

wherein $R_2$ is hydrogen or methyl and $R_3$ is a linear or branched aliphatic group having from 2 to 22 carbon atoms, a homopolymer of such an ester having a Vicat softening temperature below 90° C.;

(C) 0 to 50 percent by weight of methyl methacrylate; and (D) 0 to 20 percent by weight of an oprotic monomer having a polar group.

12 Claims, No Drawings

MOLDING COMPOSITIONS FOR OPTICALLY READABLE INFORMATION-STORAGE MEDIA

The present invention relates to molding compositions for optically readable data storage media made of a synthetic resin, which compositions are distinguished by low moisture absorption and good optical and mechanical properties. These molding compositions are suitable for processing by injection molding, extrusion, etc.

In published German patent application DOS No. 28 53 262, reference is made to problems which can arise in the production of optically readable storage media due to moisture absorption by the polymeric material used. That publication suggests, among other things, the use of a radiation curable coating containing an aprotic mixture of acrylic esters such as hydroxyalkyl acrylate or aminoalkyl acrylate.

In published German patent application DOS No. 30 28 498, the difficulties encountered are attributed at least in part to the development of a moisture gradient in the storage medium and steps to be taken to avoid such a gradient are suggested. The undesirable effects of nonuniform moisture absorption ("umbrella effect") are stressed also in U.S. Pat. No. 4,310,919. There the solution of the problem is seen in a perfectly symmetrical structure of the data storage disk.

Improved polymeric materials for use as substrates for optically readable storage media are also the object of published German patent applications DOS Nos. 32 48 601 and 32 48 602. In DOS No. 32 48 601, polymers having low water absorptive capacity and low birefringence are recommended, which polymers contain from 10 to 100 weight percent of methylstyrene, preferably from 20 to 80 weight percent, optionally together with 0 to 20 percent by weight of other vinyl aromatic compounds, up to 50 percent by weight of aromatically substituted acrylic acid esters and methacrylic acid esters, up to 80 percent by weight of methylmethacrylate, up to 50 percent by weight of other esters of methacrylic acid, and up to 15 percent by weight of crosslinking monomers, with the condition that the monomers containing aromatic groups amount to at least 10 percent by weight of all the monomers.

DOS No. 32 48 602 proposes acrylic resins of low water-absorptive capacity as a storage material for optically readable information, which resins comprise at least three comonomer groups, from 20 to 85 weight percent being methyl methacrylate and the remainder being acrylic acid esters or methacrylic acid esters and/or esters, different from methyl methacrylate, substituted with aromatic, aliphatic, or alicyclic hydrocarbon groups and/or styrene or alphamethylstyrene, as well as up to 9.9 percent by weight of 4-methylstyrene and, optionally, further monomers of limited water solubility and/or crosslinking monomers.

Both publications stress that birefringence is a serious problem, as is water absorption.

From practical experience with optical storage media made of synthetic resins, a number of requirements may be formulated which must be met for the media to be fit for use. These are:

transparency;
moisture absorption not over 0.7 weight percent;
a vicat softening temperature above 80° C.;
low birefringence after processing (injection molding);
high light transmittance also in the ultraviolet region, and;
good mechanical properties, especially a high modulus of elasticity and low brittleness.

The molding compositions available at present for optically readable storage media do not satisfy these requirements in every respect. When aromatic monomers are used, the birefringence is likely to be too high. While polymers of cycloaliphatic esters of acrylic and/or methacrylic acid do not have the desired Vicat softening temperature, they are mostly extremely brittle. The commonly employed aliphatic methacrylic esters usually yield materials which, though tough, are soft.

Thus there has been a need for molding compositions which largely meet the practical requirements listed above, can be produced relatively easily, and are easily processable.

This need is filled by the molding compositions in accordance with the present invention.

More in particular, these comprise a copolymer which is free of aromatic hydrocarbons and contains (A) a methacrylic acid ester of the formula

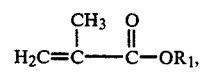

wherein $R_1$ is an alicycle or alkyl-substituted alicycle having from 5 to 19, and preferably from 6 to 12, carbon atoms, in an amount ranging from 5 to 95, and preferably from 20 to 70, percent by weight, the Vicat softening temperature (as determined in conformity with DIN 53460) of a homopolymer formed from a monomer of the aforementioned formula being above 80° C., and preferably up to 120° C.

$R_1$ in the aforementioned formula is derived from an alcohol component, $R_1OH$, which suitably can be cyclohexanol or an alkylated cyclohexanol or a cyclohexyl alkanol such as 3,3,5-trimethylcyclohexanol, 2-methylcyclohexanol, 4-ethylcyclohexanol, 3-methylcyclohexanol, 2,3-dimethylcyclohexanol, 3,4-dimethylcyclohexanol, 2-tert.butyl-cyclohexanol, or 4-tert.-amyl-cyclohexanol. Other suitable alcohols $R_1OH$ are terpenoid alcohols such as menthol, bicyclic systems such as borneol, isoborneol, and hydroxymethylnorbornane, and tricyclic systems such as hydroxymethyltricyclo[5.2.10$^{2.6}$]decane and 8(9)-hydroxytricyclo[5.2.1.0$^{2.6}$]decane.

The copolymer further contains (B) acrylic acid or methacrylic acid esters of the formula

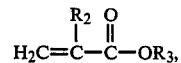

wherein $R_2$ is hydrogen or methyl and $R_3$ is a linear or branched aliphatic alcohol having from 2 to 22 carbon atoms, in an amount ranging from 95 to 5, and preferably from 80 to 20, percent by weight of the copolymer, a homopolymer formed from an ester of this formula having a Vicat softening temperature (DIN 53460) below 90° C. Of special interest are esters of $C_2$ to $C_9$ alcohols with branching in the molecule, for example isopropyl, isobutyl, neopentyl, 3-methylbutyl, 2-ethylbutyl or 2-ethylhexyl, alcohol, and also esters of propanol and butanol. Moreover, the copolymer may contain (C) from 0 to 50 percent, preferably from 20 to 40 percent, of methyl methacrylate by weight of the polymer.

Optionally, the copolymer may further contain, in an amount ranging from 0 to 20, and preferably from 5 to 15 percent by weight of polymer, of adhesion promoting aprotic monomers (D) of the formula

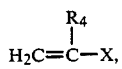

wherein $R_4$ is hydrogen or methyl and X is —CN or a group —Y—A—Z, wherein Y is

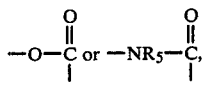

wherein $R_5$ is alkyl having 1 to 6 carbon atoms, A is a linear or branched hydrocarbon chain having 1 to 8 carbon atoms, and Z is —Cl, —CN, —OCH$_2$—CH$_2$—O—CH$_2$CH$_3$,

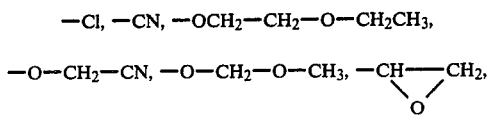

wherein $R_6$ is ($C_1$-$C_3$)-alkyl or phenyl, or wherein —AZ is the group

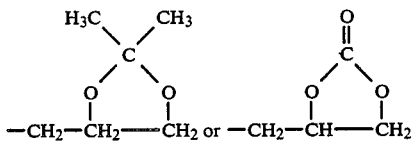

One or more monomers from these four groups may go into the composition of the copolymers.

The average molecular weight of the copolymer usually is from 50,000 to 300,000 and preferably ranges from 100,000 to 200,000. It is conveniently determined by gel permeation chromatography.

The copolymers composed of the components (A), (B) and, optionally, (C) and (D) will usually have a Vicat softening temperature (DIN 53460) above 90° C., and preferably up to 120° C.

The molding compositions of the invention have exceptionally good optical properties. They are usually transparent, with a light transmittance (d=3 mm) greater than 90 percent. These molding compositions are further notable for the fact that generally no birefringence is observable after injection molding. The moisture absorption (as determined in conformity with DIN 53495 following prolonged immersion in cold water) is in all cases under 0.8, and preferably under 0.7, weight percent, and in special cases under 0.6 weight percent.

Moreover, the molding compositions of the invention have very good mechanical properties, for example a modulus of elasticity (in conformity with DIN 53457) greater than 2,500 N/mm$^2$ and an elongation at rupture (DIN 53455) greater than 2 percent.

The invention molding compositions can readily be processed by the usual methods, for example injection molding. The copolymers can be produced quite generally by the method used for methyl methacrylate or its copolymerization with other monomers. (See also Houben-Weyl, *Methoden der organischen Chemie*, 4th ed., vol. 14/1).

The polymers of the invention are preferbly produced by free radical bulk, solution, suspension, or emulsion polymerization. The polymer solids are isolated from a solution by precipitation with a nonsolvent such as methanol; from a suspension by filtration, washing, and drying of the beads; and from an emulsion by spray drying, freeze coagulation, or precipitation.

The polymerization initiators may be organic peroxides, peresters or azo compounds used in the usual amounts, for example from 0.02 to 0.3, and preferably from 0.05 to 0.1, percent by weight of the monomers. Illustrative initiators are dicyclohexyl peroxide, tert-butyl perneodecanoate, tert-butyl peroctoate, and 2,2'-azobisisobutyronitrile. The polymerzation temperature will depend on the rate of decomposition of the initiators. At the start it may be on the order of 50° C. and later is preferably increased to 100°±15° C., for example.

To obtain the desired molecular weight, the known organosulfur chain transfer agents, for example dodecyl mercaptan, tert-dodecyl mercaptan, 2-ethylhexyl thioglycolate, etc., are generally used in the usual amounts ranging from 0.1 to 1 weight percent.

Shaped articles can be produced conventionally by polymerization using an initiator and, optionally, a redox component, and possibly starting from monomer/polymer systems.

However, shaped articles are preferably obtained by injection molding or extrusion. They may also be produced by compression molding.

A better understanding of the present invention and of its many advantages will be had by referring to the following specific examples, given by way of illustration. Unless otherwise noted, the percentages referred to are by weight.

General procedure

A mixture of 0.05 to 0.1 percent of tert-butyl perneodecanoate, 0.05 to 0.1 percent of tert-butyl permaleinate, and, optionally, 0.05 percent of tert-butyl permaleinate as well as 0.4 to 0.5 percent dodecyl mercaptan is added to a mixture of monomers with stirring. This is followed by filtration and repeated vacuum degasification for the elimination of oxygen. After charging the material to foil-lined polymerization chambers, it is polymerized for about 24 hours at 50° C. in a water bath and then held at 110° C. for 10 hours. After removal from the polymerization chambers, the material is ground in a hammer mill and then granulated in a vented extruder. The granules can be conventionally processed further, for example they may be extruded, compression-molded, injection-molded, etc.

This is the procedure used to prepare the polymers listed in the Table which follows. The physical data given were determined on 3 mm thick injection-molded specimens in conformity with the following standards:

| | |
|---|---|
| Viscosity (reduced viscosity) | DIN 1342 |

| -continued | |
|---|---|
| Vicat softening temperature | DIN 53460 |
| Modules of elasticity | DIN 53457 |
| Elongation at rupture | DIN 53455 |

Without exception, the polymers reported in the Table have a molecular weight in the region from $5(10^4)$ to $3(10^5)$.

TABLE

| Composition | $\eta_{sp}/C$ (ml/g) | VST (°C.) | $H_2O$-Uptake (%) | Modulus of Elasticity (N-mm$^{-2}$) | Elongation at Rupture (%) |
|---|---|---|---|---|---|
| CHMA/EMA 60/40 | 84 | 89 | 0.49 | 2660 | 2.3 |
| CHMA/i-BuMA/MMA | | | | | |
| 50/30/20 | 99 | 90 | 0.46 | 2750 | 2.6 |
| 30/30/40 | 128 | 100 | 0.68 | 2910 | 2.9 |
| CHMA/i-PrMA/MMA | | | | | |
| 50/30/20 | 107 | 93 | 0.56 | 2830 | 2.7 |
| 30/40/30 | 58 | 98 | 0.71 | 2840 | 2.2 |
| 30/50/20 | 99 | 96 | 0.60 | 2830 | 3.4 |
| CHMA/i-BuMA/DMPMA/MMA 20/30/10/40 | 120 | 101 | 0.63 | 2910 | 2.8 |
| TMCHMA/i-BuMA/MMA 30/50/20 | 106 | 93 | 0.34 | 2530 | 2.2 |
| IBMA/i-BuMA/MMA 30/50/20 | 103 | 94 | 0.54 | 2830 | 2.1 |
| CHMA/i-BuMA/AN 70/20/10 | 132 | 88 | 0.43 | 2515 | 2.9 |
| MENTMA/EBuMA/MMA 30/40/30 | 99 | 92 | 0.58 | 2840 | 2.3 |
| BorMa/MeBuMa/MMA 40/30/30 | 94 | 90 | 0.55 | 2790 | 2.2 |
| MATCD/EHexMA/MMA 30/30/40 | 68 | 97 | 0.61 | 2920 | 2.1 |
| CDMA/PrMA/MMA 30/20/50 | 73 | 93 | 0.68 | 2870 | 2.7 |
| IBCHMA/BuMA/MMA 25/45/30 | 96 | 93 | 0.52 | 2900 | 2.5 |
| CHMA/BuMA/MMA/CNEMA 30/30/30/10 | 79 | 87 | 0.69 | 2920 | 2.9 |
| TCHMMA/i-BuMA/MMA 30/20/30 | 97 | 97 | 0.49 | 2940 | 2.0 |
| t-BuCHMA/DcMA/MMA 60/20/20 | 114 | 98 | 0.52 | 2690 | 2.4 |
| COMA/HMA/MMA/ClEMA 40/20/35/5 | 128 | 87 | 0.66 | 2870 | 2.8 |
| CHBuMA/BuMA/MMA/GlyMA 30/32/30/8 | 92 | 86 | 0.69 | 2670 | 2.8 |
| CHPMA/i-PrMA/MMA 50/30/20 | 67 | 93 | 0.57 | 2830 | 2.7 |
| DHyNMA/i-BuMA/MMA 30/50/20 | 128 | 98 | 0.50 | 2980 | 2.9 |
| MCHMA/HMA/MMA/MEMA 40/40/14/6 | 77 | 88 | 0.69 | 2860 | 2.7 |
| ECHMA/i-PrMA/EOEOMA 30/65/5 | 89 | 89 | 0.67 | 2620 | 2.9 |
| DMCHMA/MeBuMA/MAN 60/34/6 | 107 | 93 | 0.70 | 2760 | 2.5 |
| MOMN/EHexMA/MMA/MeMPMAA | 62 | 91 | 0.68 | 2760 | 2.7 |

TABLE-continued

| Composition | $\eta_{sp}/C$ (ml/g) | VST (°C.) | H₂O-Uptake (%) | Modulus of Elasticity (N-mm⁻²) | Elongation at Rupture (%) |
|---|---|---|---|---|---|
| 35/35/25/5 | | | | | |

1. AN = Acrylonitrile
2. CHMA = Cyclohexylmethacrylate
3. DMPMA = 2,2-Dimethylpropyl-1-methacrylate
4. EMA = Ethylmethacrylate
5. IBMA = Isobornylmethacrylate
6. i-BuMA = i-Butylmethacrylate
7. i-PrMA = i-Propylmethacrylate
8. MMA = Methylmethacrylate
9. TMCHMA = 3,3,5-Trimethylcyclohexylmethacrylate
10. MENTMA = Menthylmethacrylate
11. EBuMA = 2-Ethylbutylmethacrylate
12. BorMA = Bornylmethacrylate
13. MeBuMA = 3-Methylbutylmethacrylate
14. MATCD = 3(4)-Methacryloyl-oxymethyltricyclo[5.2.1.0²·⁶]decane
15. CDMA = Cyclodecylmethacrylate
16. EHexMA = α-Ethylhexyl-methacrylate
17. PrMA = n-Propylmethacrylate
18. IBCHMA = Isobornylcyclohexylmethacrylate
19. BuMA = n-Butylmethacrylate
20. CNEMA = Cyanoethylmethacrylate
21. TCHMMA = Tricyclohexylmethylmethacrylate
22. t-BucHMA = 4-tert.Butylcyclohexylmethacrylate
23. DcMA = Decylmethacrylate
24. COMA = Cyclooctylmethacrylate
25. HMA = Hexylmethacrylate
26. ClEMA = Chloroethylmethacrylate
27. CHBuMA = Cyclohexylbutylmethacrylate
28. GlyMA = Glycidylmethacrylate
29. CHPMA = Cyclohexylpropylmethacrylate
30. DHyNMA = Decahydronaphthylmethacrylate
31. MCHMA = 2-Methylcyclohexylmethacrylate
32. MEMA = Morpholinoethylmethacrylate
33. ECHMA = 4-Ethylcyclohexylmethacrylate
34. EOEOMA = 2-[2-(2-Ethoxyethoxy)ethoxy]ethylmethacrylate
35. DMCHMA = 2,3-Dimethylcyclohexylmethacrylate
36. MAN = methacrylonitrile
37. MOMN = Methacryloyloxymethylnorbornane
38. MeMPMAA = 1-Methyl-N—(3-Morpholinopropyl)methacrylamide The following comonomers of type A are employed as in the TABLE above.
3-methycyclohexylmethacrylate
3,4-dimethylcyclohexylmethacrylate
2-tert.butylcyclohexylmethacrylate
4-tert.amylcyclohexylmethacrylate
8(9)-methacryloyloxytricyclo[5.2.1.0²·⁶]decane Comonomers of type D also employed are:
4-Methacryloyloxymethyl-2,2-dimethyldioxolane
4-Methacryloyloxymethyl-dioxolan-2-one

What is claimed is:

1. A copolymer, adaptable to use as a molding composition for making optically readable data storage media, said copolymer being free of aromatic groups and comprising
   (A) from 20 to 70 percent by weight of at least one ester of the formula

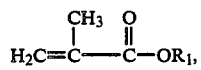

wherein $R_1$ is derived from an alcohol, $R_1OH$, which is cyclohexanol, an alkyl-substituted cyclohexanol wherein each alkyl has up to 12 carbon atoms, a cyclohexylalkanol, or a bicyclic or tricyclic alcohol, with the proviso that a homopolymer of such an ester have a Vicat softening temperature (in conformity with DIN 53460) above 80° C.;
   (B) from 10 to 60 percent by weight of at least one ester of the formula

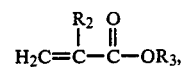

wherein $R_2$ is hydrogen or methyl and $R_3$ is a linear or branched aliphatic group having from 2 to 22 carbon atoms, with the proviso that a homopolymer of such an ester have a Vicat softening temperature (in conformity with DIN 53460) below 90° C.;
   (C) from 20 to 40 percent by weight of methyl methacrylate; and
   (D) from 0 to 20 percent of at least one aprotic monomer having a polar group X, of the formula

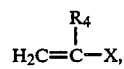

wherein $R_4$ is hydrogen or methyl and X is —CN or —Y—A—Z, wherein Y is

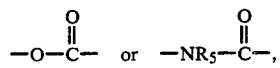

wherein $R_5$ is alkyl having from 1 to 6 atoms, A is a hydrocarbon chain having from 1 to 8 carbon atoms, and Z is —Cl, —CN, —O—CH₂—CH₂—CN,
—OCH₂—CH₂—O—CH₂—CH₃, —O—CH₂—O—CH₃, -continued

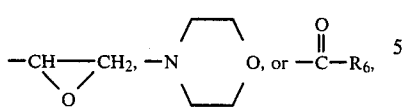

wherein $R_6$ is $(C_1-C_3)$-alkyl or phenyl, or wherein A—Z is

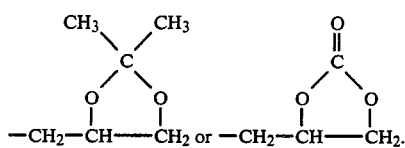

2. A copolymer as in claim 1 wherein $R_1OH$ is a terpenoid alcohol.

3. A copolymer as in claim 2 wherein $R_1OH$ is isoborneol.

4. A copolymer as in claim 1 wherein $R_1OH$ is a tricyclic alcohol of the formula 5. A copolymer as in claim 1 wherein $R_1OH$ is 3,3,5-trimethylcyclohexyanol.

6. A copolymer as in claim 1 wherein $R_3$ is alkyl having from 2 to 8 carbon atoms.

7. A copolymer as in claim 6 wherein $R_3$ is ethyl, propyl, isopropyl, butyl, isobutyl, 3-methylbutyl, neopentyl, 2-ethylbutyl, or 2-ethylhexyl.

8. A copolymer as in claim 1 wherein said monomers (D) are selected from the group consisting of acrylonitrile, methacrylonitrile, glycidyl methacrylate, chloroethyl acrylate, and chloroethyl methacrylate.

9. A copolymer as in claim 1 wherein said copolymer has an average molecular weight ranging from $5 \times 10^4$ to $3 \times 10^5$.

10. A copolymer as in claim 1 wherein said copolymer has a Vicat softening temperature (in conformity with DIN 53460) above 80° C.

11. A copolymer as in claim 1 wherein said copolymer has a modulus of elasticity (in conformity with DIN 53457) greater than 2,500 N/mm² and an elongation at rupture (DIN 53455) greater than 2 percent.

12. A copolymer as in claim 1 wherein the moisture absorption of the copolymer (in conformity with DIN 53495) does not exceed 0.7 percent by weight.

* * * * *